United States Patent [19]

Johnston

[11] Patent Number: 4,624,193
[45] Date of Patent: Nov. 25, 1986

[54] METHOD AND APPARATUS FOR THE JET INJECTION OF AGRICULTURAL LIQUIDS INTO THE SOIL

[75] Inventor: Douglas Johnston, Decatur, Ala.

[73] Assignee: John Blue Company, New York, N.Y.

[21] Appl. No.: 766,080

[22] Filed: Aug. 15, 1985

Related U.S. Application Data

[63] Continuation of Ser. No. 491,275, May 4, 1983, abandoned.

[51] Int. Cl.$^4$ .............................................. A01C 23/62
[52] U.S. Cl. ........................................................ 111/6
[58] Field of Search .................... 111/6, 7.1, 7.2, 7.3, 111/7.4; 239/66, 276; 137/624.18

[56] References Cited

U.S. PATENT DOCUMENTS

| | | | |
|---|---|---|---|
| Re. 25,307 | 12/1962 | Johnston | 111/6 |
| 2,930,334 | 3/1960 | Marron et al. | 111/6 |
| 3,012,526 | 12/1961 | Baldwin et al. | 111/6 |
| 3,136,274 | 6/1964 | Townsend | 111/6 |
| 3,409,033 | 11/1968 | Johnston | 111/6 |
| 3,435,785 | 4/1969 | Harbolt | 111/6 |
| 3,533,366 | 10/1970 | Francom | 111/80 X |
| 3,815,525 | 6/1974 | Kainson et al. | 111/6 |
| 4,009,666 | 3/1977 | Russell et al. | 239/176 X |
| 4,034,686 | 7/1977 | Collins | 111/89 X |
| 4,074,858 | 2/1978 | Burns et al. | 111/6 X |
| 4,186,671 | 2/1980 | Huang | 111/6 X |
| 4,270,471 | 6/1981 | Talbott | 111/6 |
| 4,481,894 | 11/1984 | Brenn | 111/6 |

FOREIGN PATENT DOCUMENTS

| | | | |
|---|---|---|---|
| 328859 | 2/1973 | U.S.S.R. | 111/6 |
| 438384 | 1/1975 | U.S.S.R. | 111/6 |
| 660614 | 5/1979 | U.S.S.R. | 111/6 |

Primary Examiner—Robert A. Hafer
Assistant Examiner—Danton DeMille
Attorney, Agent, or Firm—Cushman, Darby & Cushman

[57] ABSTRACT

An improved method and apparatus for the jet injection of agricultural liquids into the soil includes a series of jet nozzles, one for each plant row, spaced along the usual tool bar carried by a tractor which normally tows a nurse tank containing the liquid. A pump having an adjustable delivery rate is driven at a rate proportional to ground speed of the tractor, normally by the power take-off of the tractor, to deliver liquid from the nurse tank under substantially constant high pressure. A timing distributor, also driven by the power take-off, connects the high pressure liquid, i.e. the pump output, successively to the nozzles so that the entire output of the pump is concentrated through one nozzle at a time, for a very brief interval, to inject a high velocity slug of liquid which will penetrate the soil to an agronomically satisfactory depth. The timing is such that one slug is injected for each nozzle during a predetermined distance of travel, e.g., 12 inches, to provide a series of equally spaced injections along each plant row.

18 Claims, 14 Drawing Figures

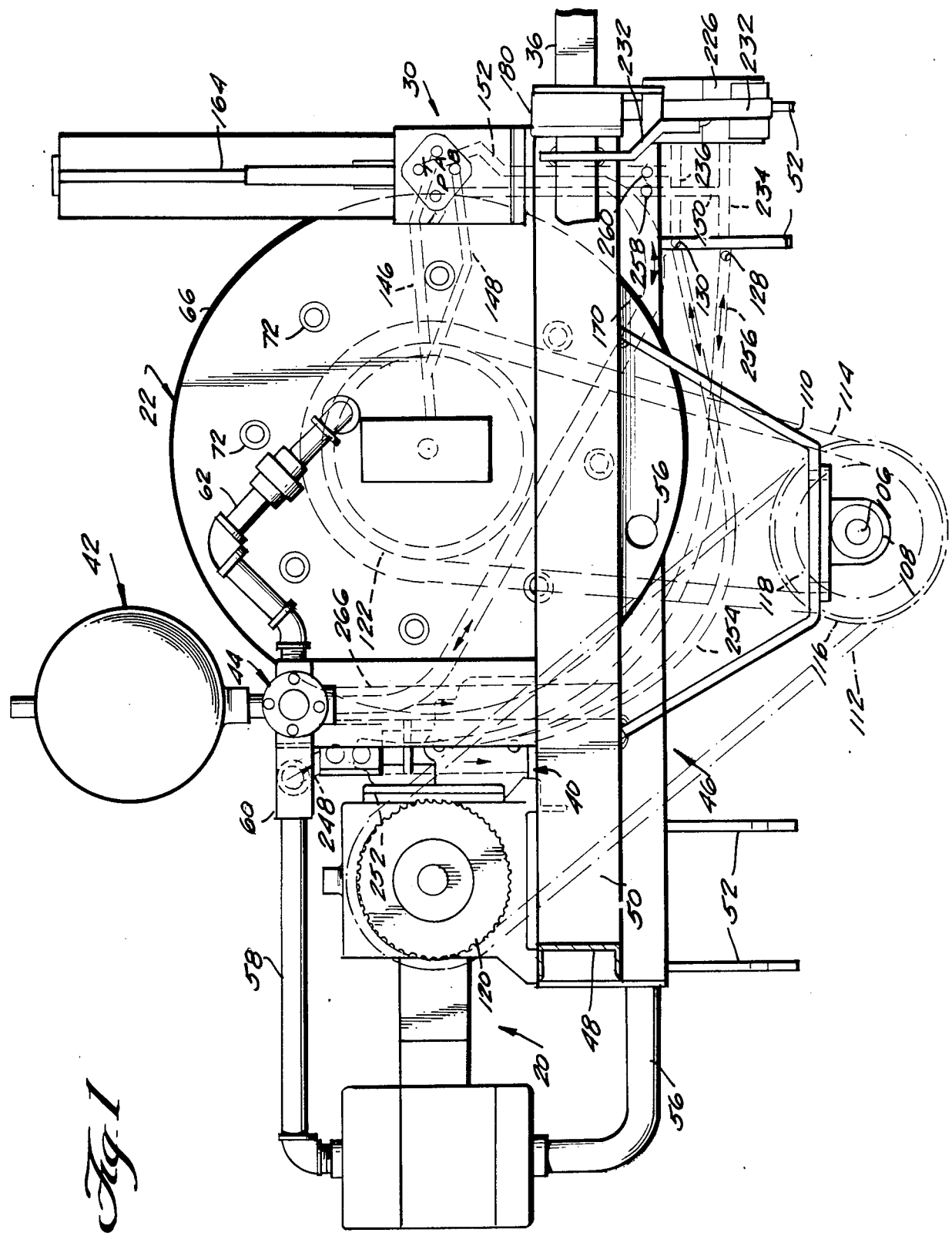

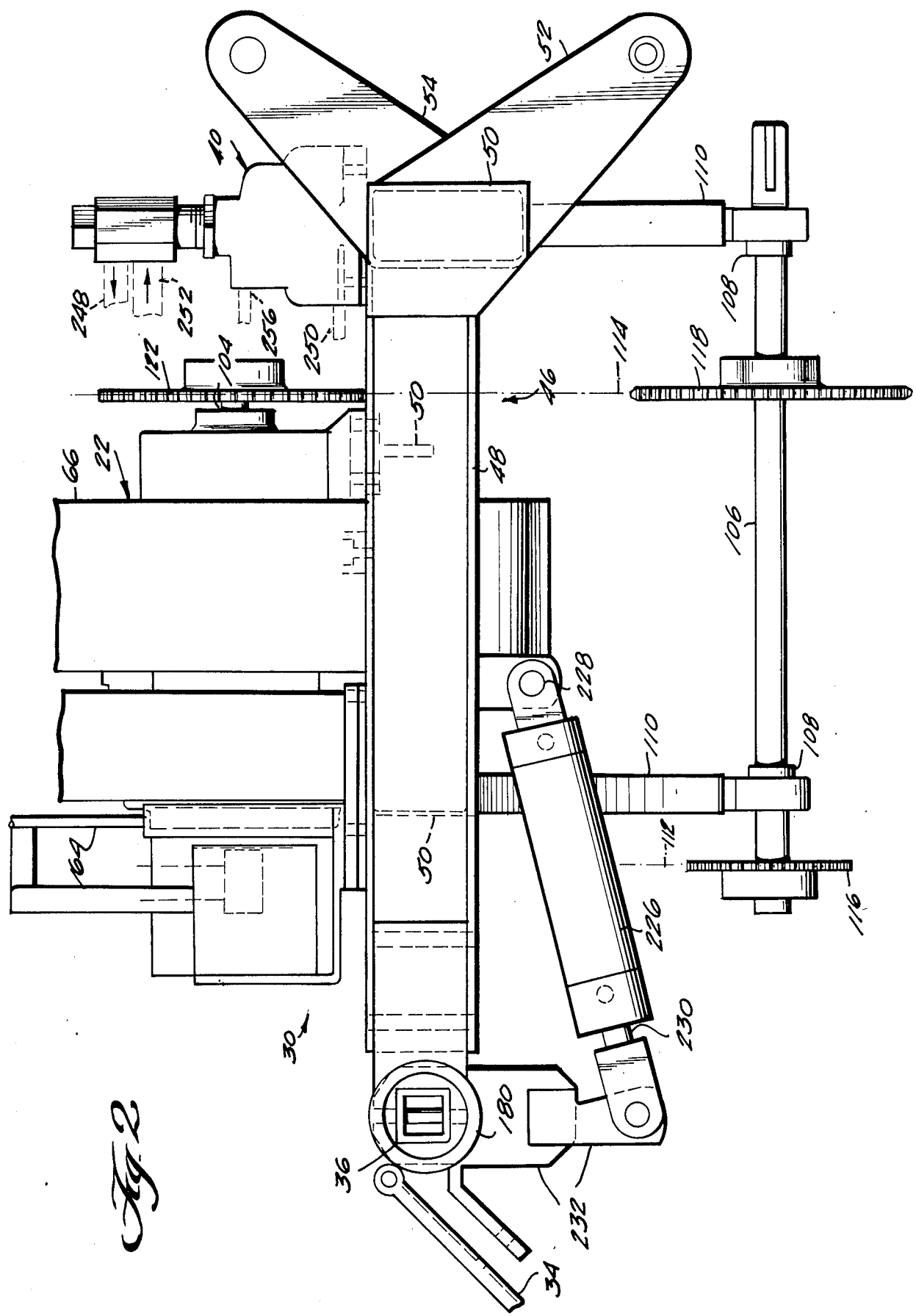

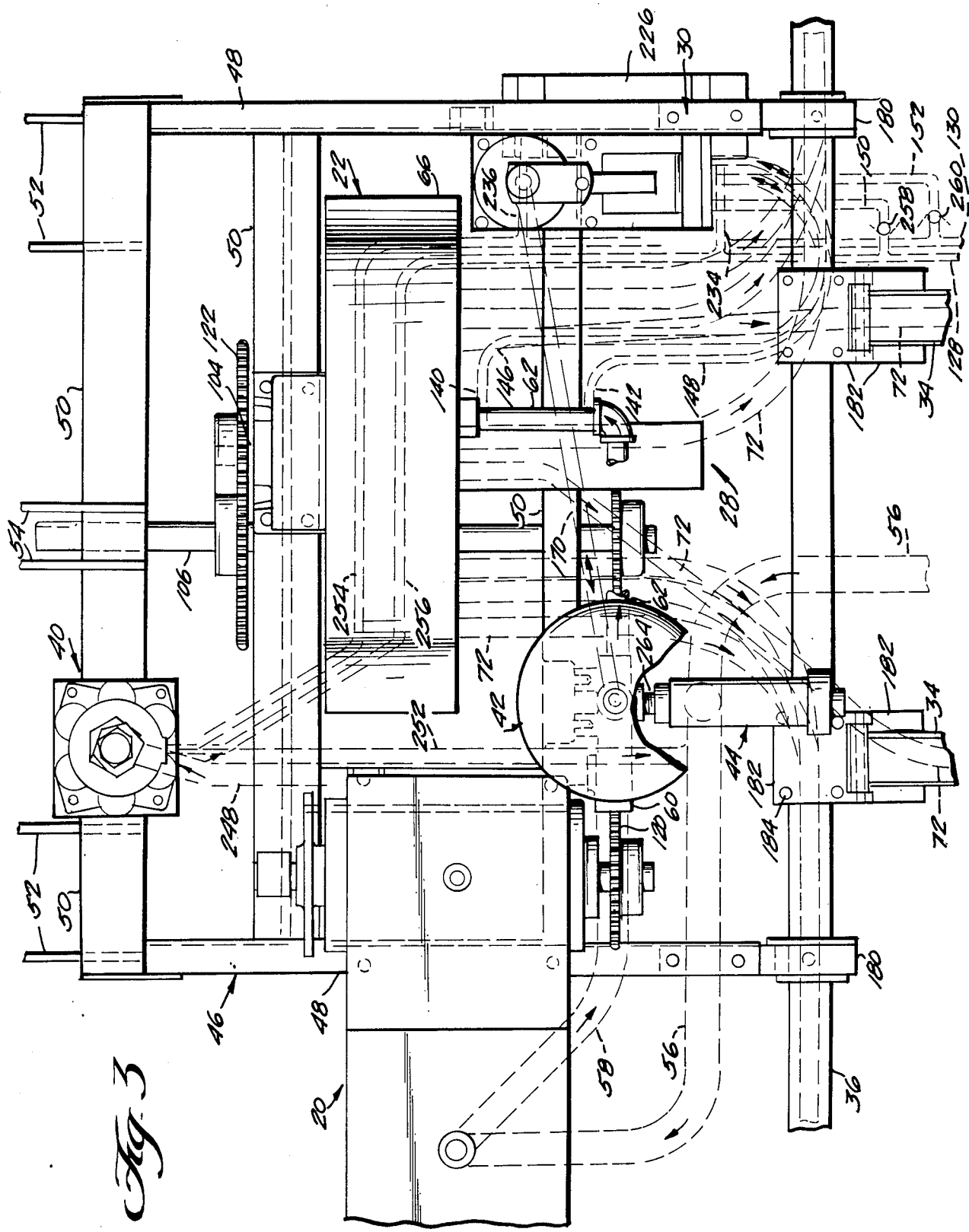

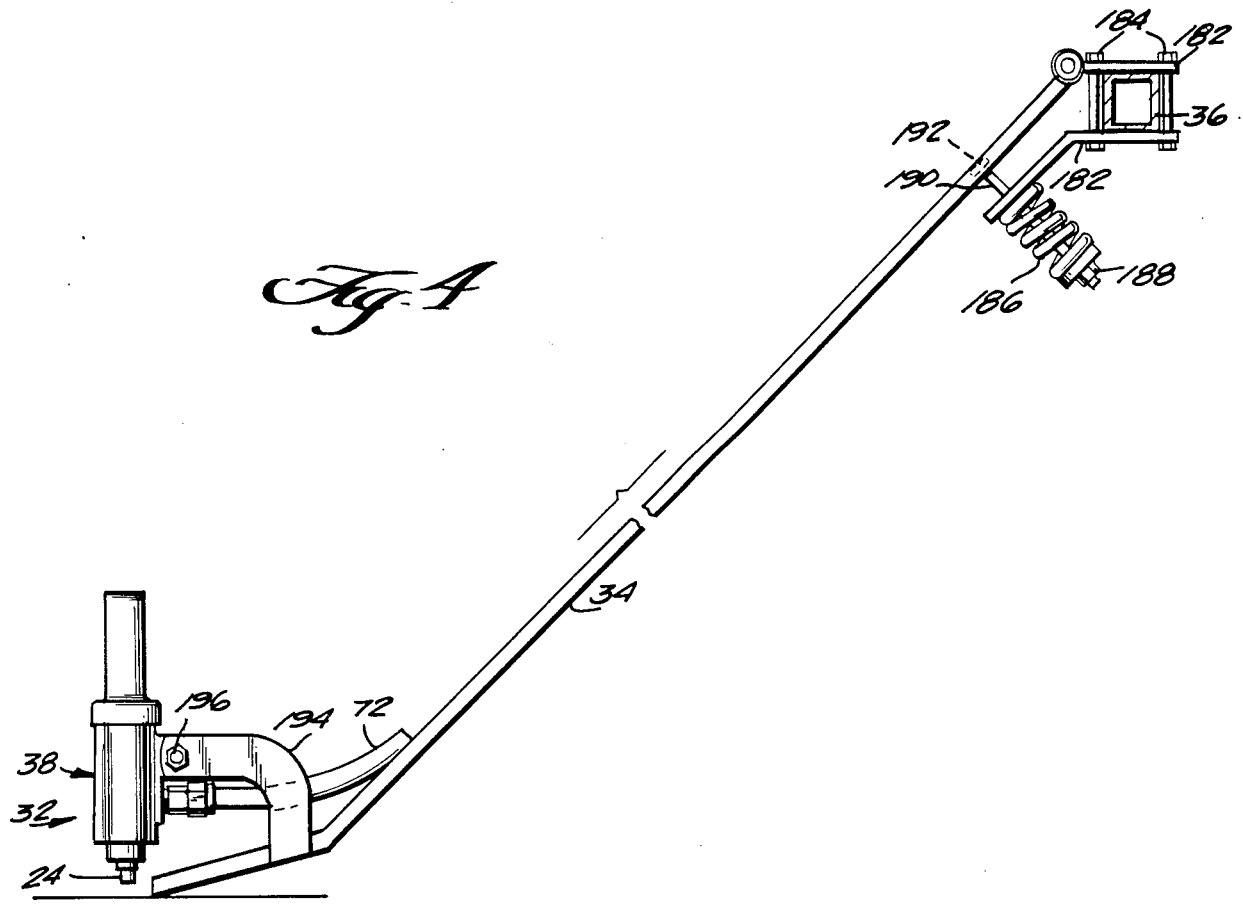
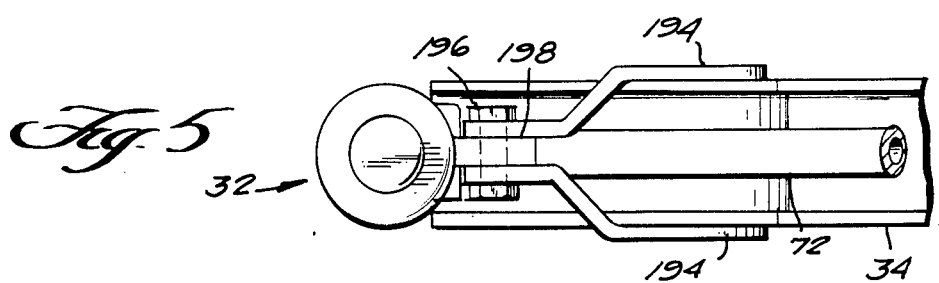

TAPPED HOLES SHOWN 180° OUT OF POSITION

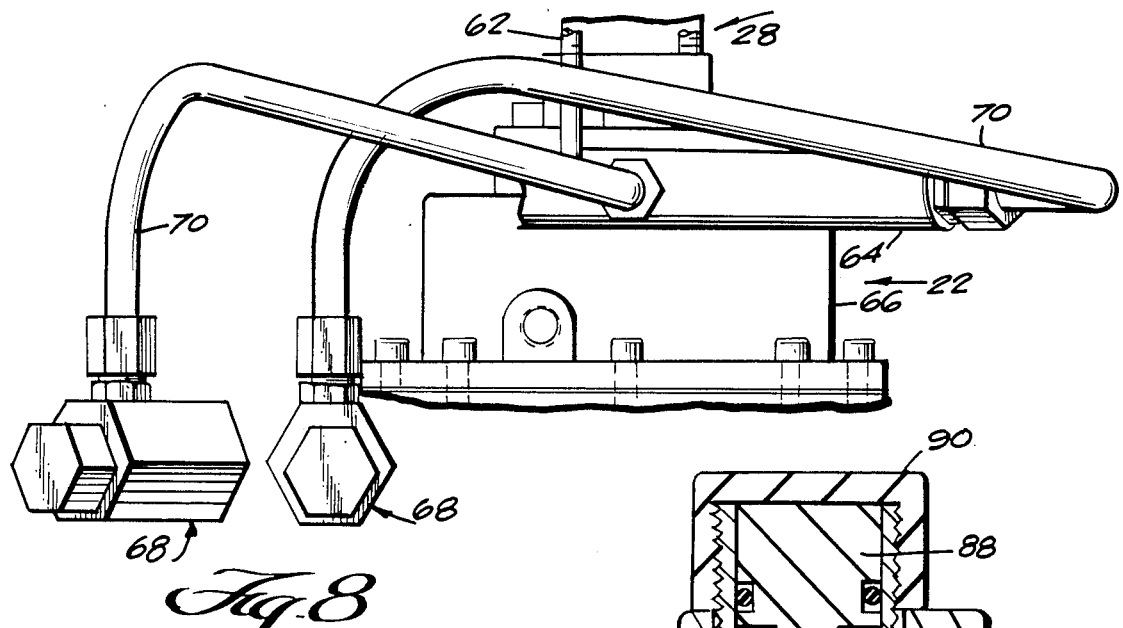
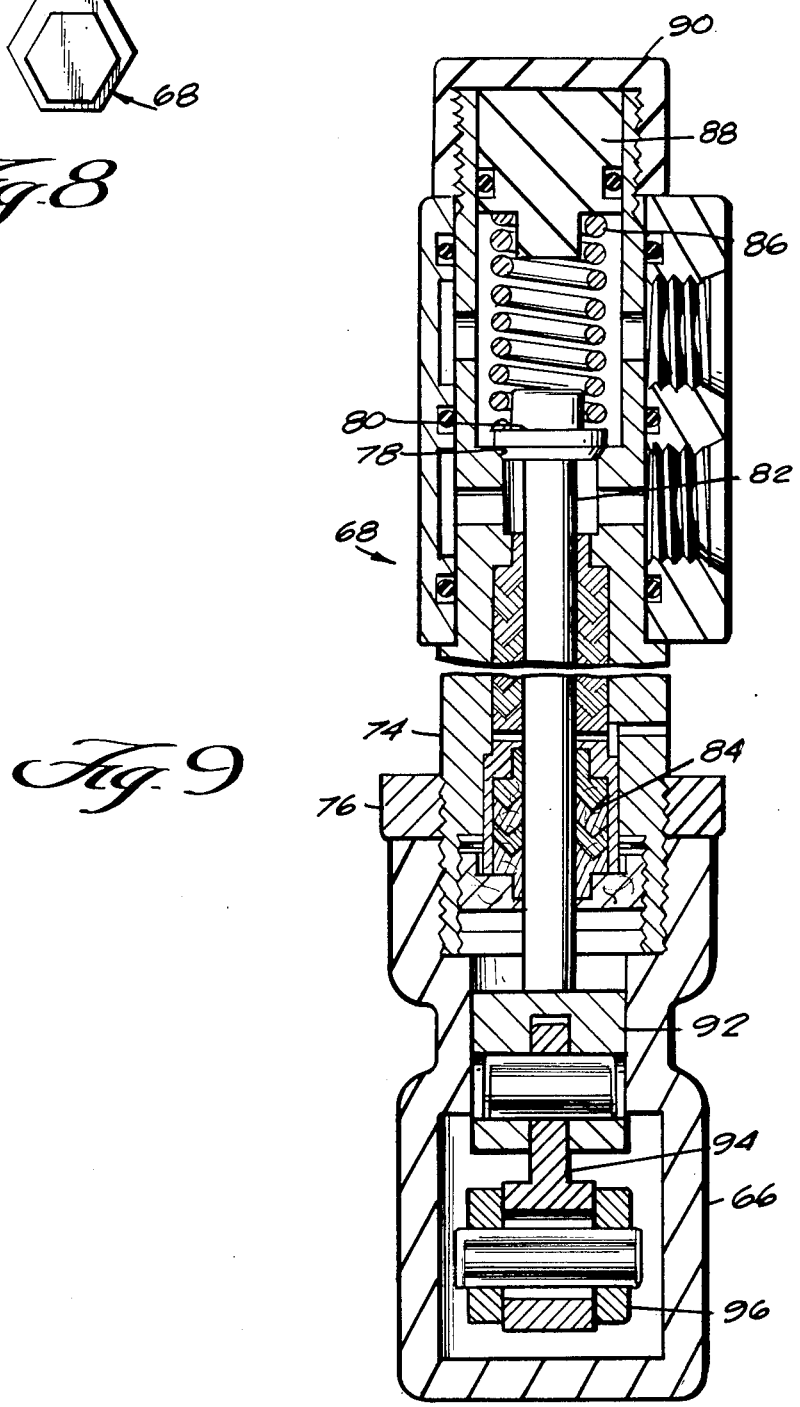

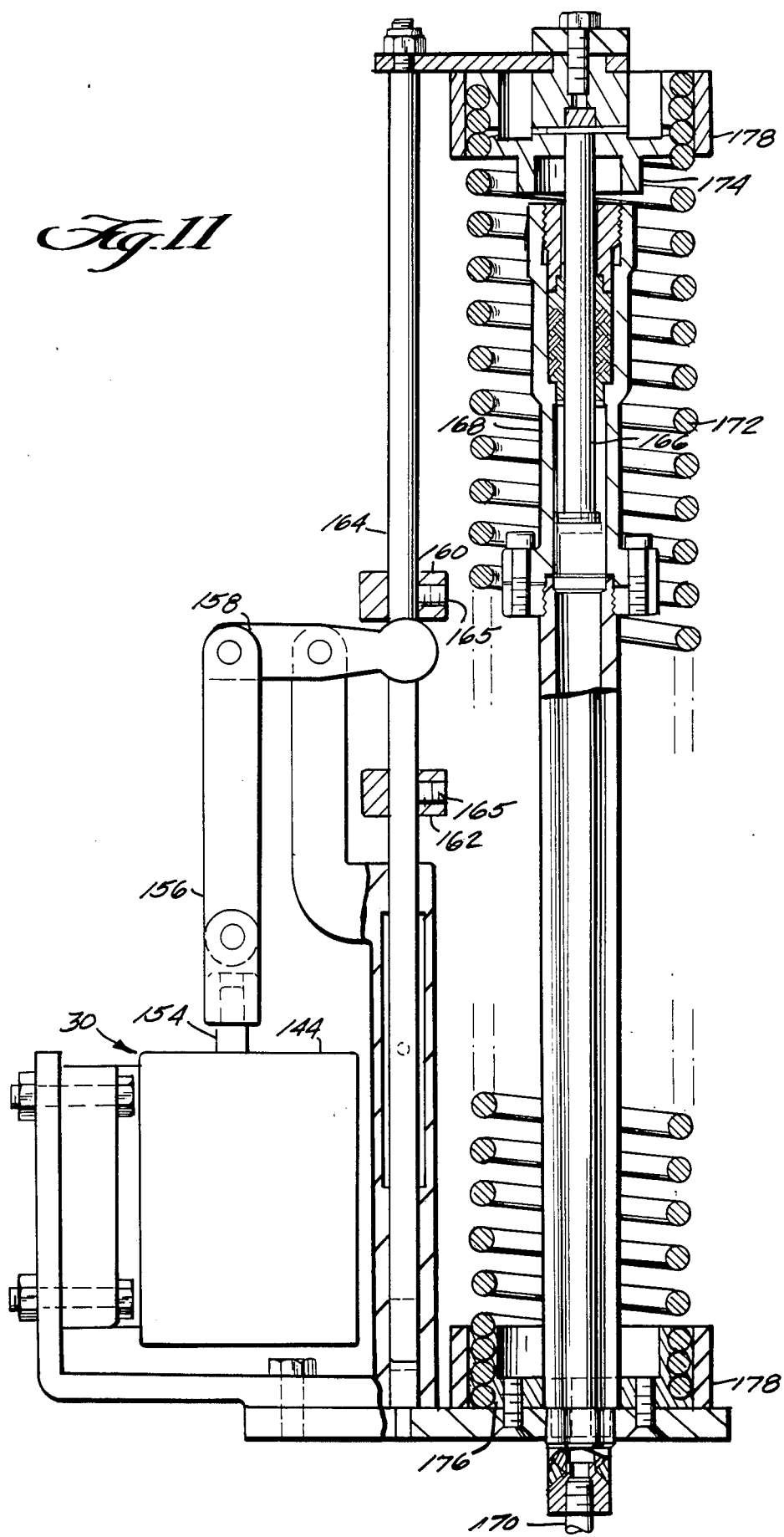

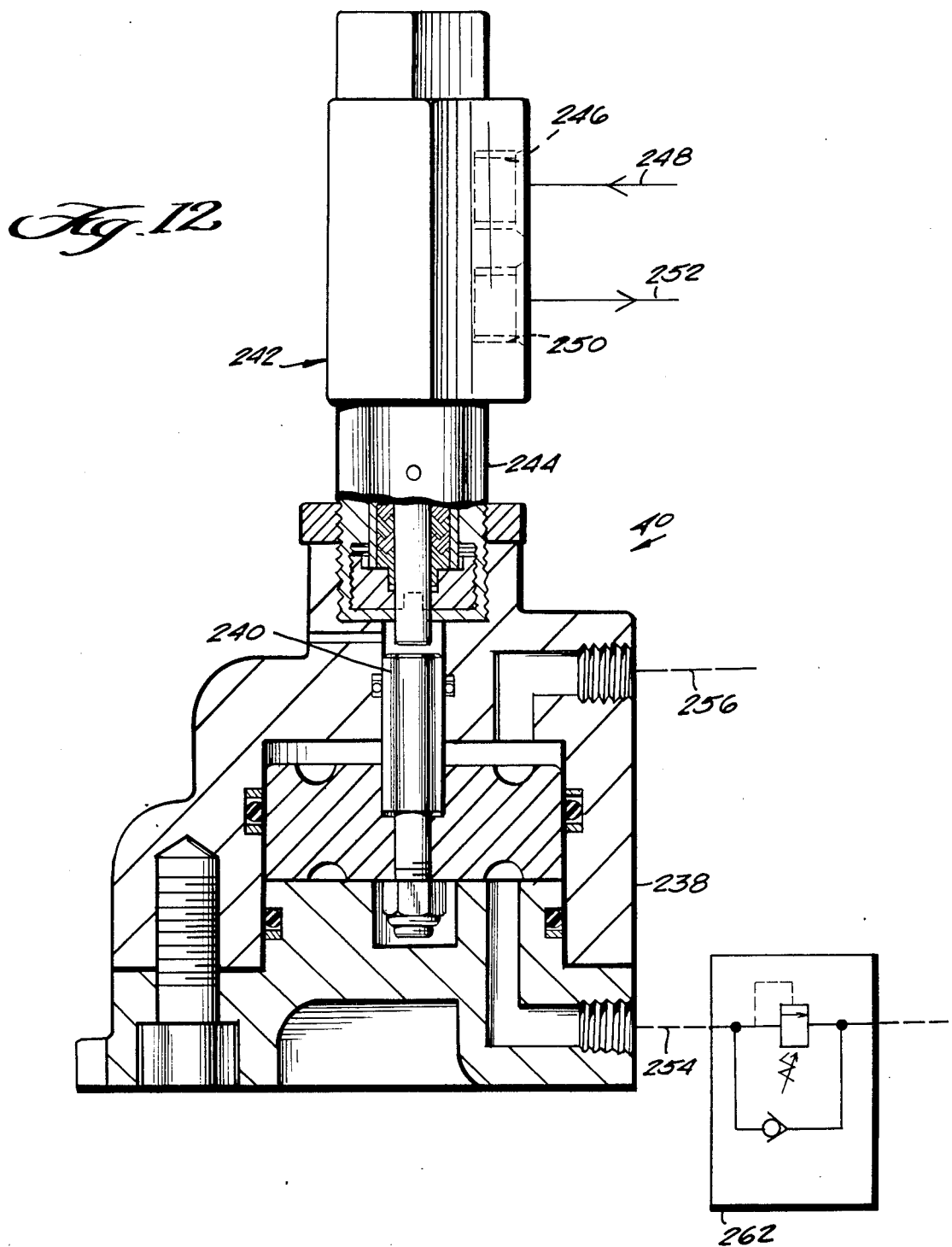

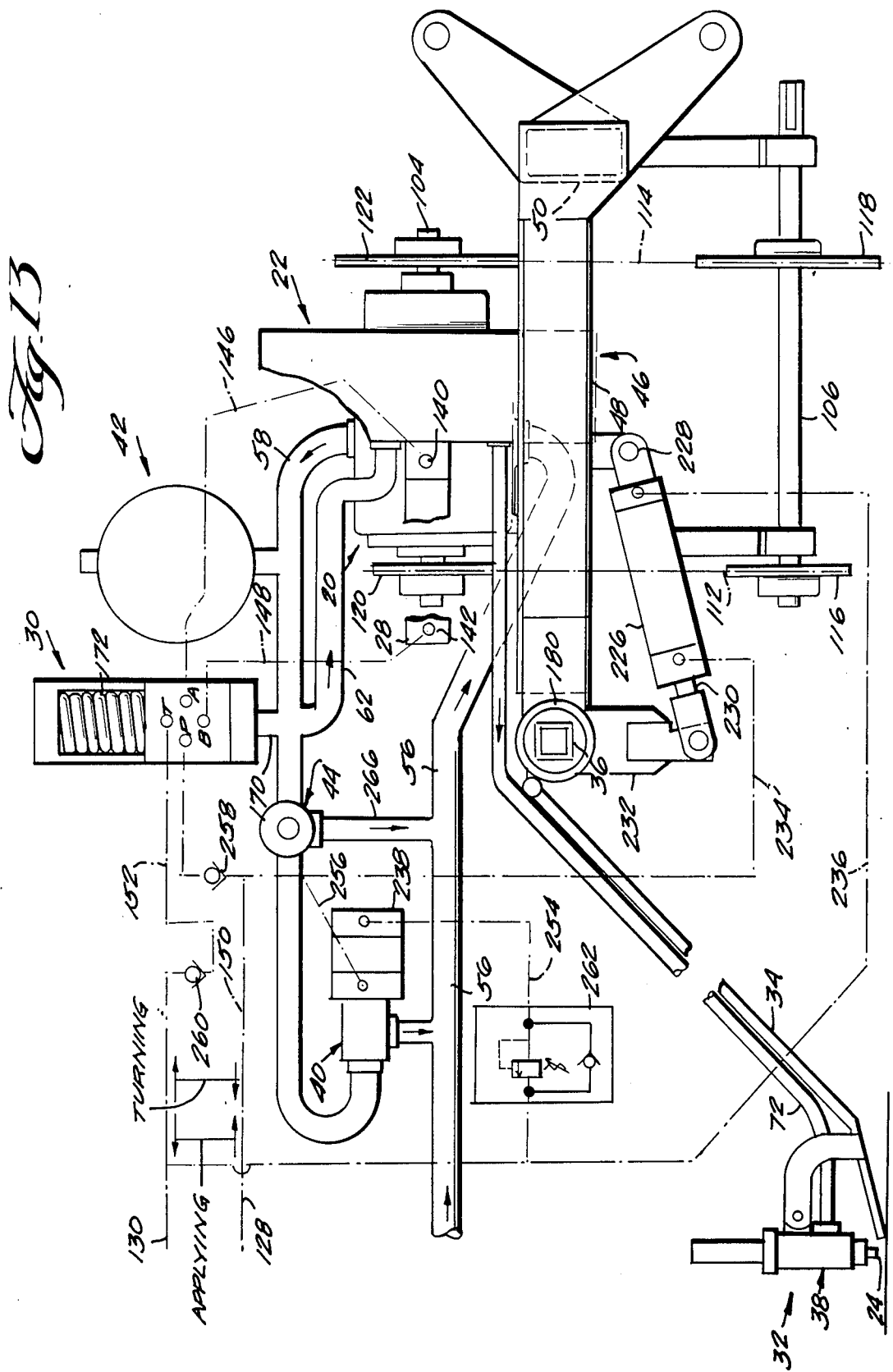

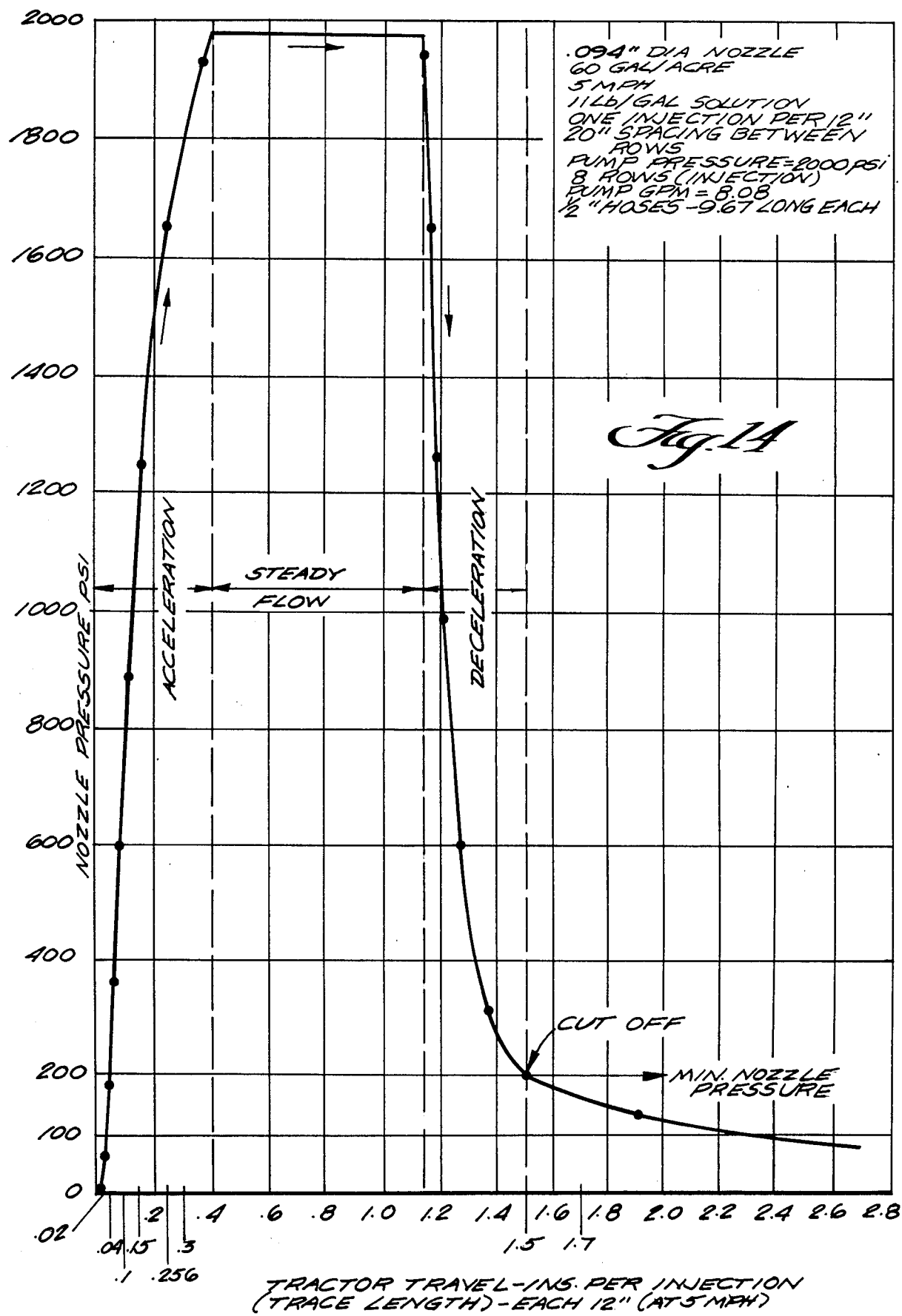

METHOD AND APPARATUS FOR THE JET INJECTION OF AGRICULTURAL LIQUIDS INTO THE SOIL

This is a continuation, of application Ser. No. 491,275, filed May 4, 1983, which was abandoned upon the filing hereof.

FIELD OF THE INVENTION

This invention relates to the sub-surface application of agricultural liquids, especially fertilizers, to the soil without appreciable disturbance thereof, e.g. by coulters, knives, plows, etc., by methods commonly known as till or no-till farming. More especially it relates to such application by a high pressure, high velocity liquid jet that penetrates to an agrinomically satisfactory depth.

BACKGROUND OF THE INVENTION

The trend toward reduced-till and no-till farming for soil and water conservation is shown graphically in an article published in the New York Times May 11, 1982, entitled "Erosion Wary Farmers Are Sparing Traditional Plow". The necessity for sub-surface application of fertilizers for efficient utilization of plant food, as indicated by research done by TVA's NFDC, universities, and agriculture experiment stations, has resulted in many proposals for solving this problem. Some of these are outlined in the article entitled "Making Fertilizer More Efficient" in the periodical "Big Farmer", April 1982 edition.

TVA scientists have stated that broadcast application of nitrogen fertilizers on no-till soils can result in losses as high as 40 percent, and the author of the "Big Farmer" article states "Efficiency standards for broadcasting phosphorous range from 10 to 30 percent." There is little doubt that even the most "backward" farmer is aware of the tremendous increase in cost of fertilizers, and the necessity for its efficient placement, which is bound to result in the adoption of sub-surface application.

Most methods of sub-surface placement in reduced-till or no-till farming involve the use of a cutting coulter running ahead of a knife or chisel plow with a liquid fertilizer application tube extending down the back of the knife or plow. Theoretically this may seem to be a good method, but the development of numerous such applicators since 1952 has proved that this method is not practical for general use. In hard ground it is practically impossible to apply enough force on coulters to keep them in the ground, and even if this can be done (by using only a minimum number) their life is very short because they are subject to bending, breakage and bearing and spindle failures. In soft ground coulters may not cut the trash, but push it below the surface where it will be caught by the applicator blade or chisel plow and tear out wide trenches in the soil. Further, unless the coulter is kept in exact alignment with the applicator blade, trash will wedge between the coulter and the blade, and tear out large chunks of soil. It is practically impossible in normal usage to keep the coulter and knife aligned for any length of time, because driver-operators will nearly always turn the machine to some degree with the tools in the ground.

Jet injection of agricultural liquids into the soil in no-till farming, i.e. without appreciable disturbance of the soil, has been proposed. Among the earliest of these proposals is that disclosed in my U.S. Pat. No. Re 25,307, Dec. 25, 1962, which had as its principal object the continuous injection of anhydrous ammonia, at the bottom of a slot cut by a coulter, with a high pressure (e.g. 2000 psi) traveling jet having a velocity of the order of at least 700 feet per second and a fineness of the order of about 0.007 to about 0.050 inch in diameter. Another proposal is that disclosed in the Baldwin et al U.S. Pat. No. 3,012,526, Dec. 12, 1961, which had as its principal object the successive injection of slugs of agricultural liquids with a high pressure (e.g. 500–1500 psi) traveling intermittent jet having a fineness of 0.080 inch in diameter. For this purpose Baldwin used a high pressure reciprocating pump and a spring-closed valve in the injection nozzle set to open at a predetermined pressure to receive liquid from the pump and create the successive high velocity slugs at the jet nozzle.

Such proposals, however, have not become commercial because of their lack of efficiency in terms of liquid placement or equipment cost and life. The sub-surface placement of a continuous band of liquid along a plant row is impractical because at normal application rates, i.e. gallons per acre, the jet must be so fine that extremely high pressures must be used to achieve sufficient penetrating power. Further, the necessary extremely small nozzle orifice would clog up constantly. Intermittent injection of liquid along a plant row has its advantages over continuous injection in that nozzle size may be increased and the jet accordingly can achieve the same penetrating power as a continuous fine jet with reduced pressure. A larger nozzle also is not so susceptible to clogging.

The arrangement shown in the aforementioned Baldwin et al patent, however, is uneconomical and impractical. It requires a separate pumping cylinder for each valved injection nozzle or injector because it is impossible to build all injectors so they will operate at the same speed and discharge at the same rate if supplied by a single central pump. It is not feasible to build a variable stroke pump of over 3 cylinders, and therefore the Baldwin et al pump, which may require 8 or 9 cylinders, must be a constant stroke pump. Any change in application rate requires the changing of the drive ratio from the tractor power take off (PTO) to the pump, which will require the operator to have on hand an almost infinite number of sprockets for providing the desired application rate—an impractical requirement. The spacing of the injections along a row cannot be controlled since the spacing depends upon the application rate. If the injector is designed to make an ejection at each average distance of 12" of travel at an application rate of 50 gallons per acre, the on centers spacing at 25 gallons per acre will be 24", and at 70 gallons per acre will be 8.6", which will require the injector to operate at 14.3 cycles per second at a ground speed of 7 mph. At this speed the inertia forces of the large valve spring, piston, and other heavy moving parts will become so high that the valve will not cycle properly and the flow to the nozzle will be throttled by the valve, reducing the discharge pressure to the extent that there will be little penetration.

Therefore, it is seen that the pressure responsive intermittent injector method, like the continuous injection method, does not provide a satisfactory method for injecting liquids into the soil.

BRIEF SUMMARY OF THE INVENTION

Accordingly, it is an object of this invention to provide an improved method and apparatus for high pressure injection of agricultural liquids into the soil without the necessity of any tillage, i.e. disturbance of the soil by mechanical means, which is efficient and economical from the standpoint of both placement of adequate quantities of liquid at the proper subsurface location and cost, life and ease of operation of the apparatus. The foregoing object is attained by the use of a series of jet nozzles, one for each plant row, spaced along the usual tool bar, creating by an appropriate pump a source of liquid under substantially constant high pressure with an adjustable delivery rate proportional to ground speed; and connecting that source successively to the nozzles at a timed rate proportional to ground speed so that the entire output of the pump is concentrated through one nozzle at a time, for a brief interval, e.g. a fraction of a second, to eject a high velocity slug of liquid that will penetrate the soil to an agrinomically satisfactory depth, e.g. 2–6 inches. The timing is such that one slug is injected from each nozzle during a predetermined distance of travel thereof, e.g. 12", to provide a series of equally spaced injections along each plant row.

The invention is accomplished by the use of a timing distributor that concentrates the entire output of an adjustable-delivery-rate high pressure pump through relatively large jet nozzles, one at a time, for only a fraction of a second. This provides the greatest possible jet penetrating power for a given maximum pressure. A continuously flowing small jet nozzle would require 4 to 5 times the pressure for the same jet penetrating power, and the nozzle would have to be so small that it would clog up continuously.

The invention provides other advantages, namely:

(a) Energy Saving

A tractor pulling 8 conventional applicator knives at 7 miles per hour applying 25 gallons per acre would require 63 horsepower (1.125 H.P./injector/mph). The pump and timing distributor of this invention will require 8.1 horsepower for the pump, based on 75% efficiency, and probably about ¾ horsepower for the distributor. The tractor would probably require 6 horsepower to pull itself and the very light ground friction of 8 injectors making a total horsepower of 14.85. This is less than ¼ the horsepower required for conventional applicator knives or blades, and if coulters are used ahead of the blades the percentage of power required would drop to less than 1/5. If the application rate were were 60 gallons per acre, the power ratio would be less than 42 percent without coulters and probably around 35 percent if coulters were used with the blades.

(b) Elimination of Tillage

Even the very best arrangement of applicator knives, with or without coulters, will defeat the purpose of no-till or reduced-till farming because they will leave furrows or trenches in which water may start soil erosion.

(c) Reduced Tractor Investment

It is quite possible that the difference in cost between a 25 and a 75 horsepower tractor will go a long way in paying the difference between a knife application system and the pressure injection system of this invention.

Other objects and advantages of the invention will become apparent from the following detailed description and accompanying drawings in which:

BRIEF DESCRIPTION OF THE DRAWINGS

FIG. 1 is a somewhat schematic fragmentary rear view, partly broken away, of an injection system embodying this invention.

FIG. 2 is a somewhat schematic fragmentary side view, with parts broken away, of the system shown in FIG. 1, taken from the right side of the latter.

FIG. 3 is a somewhat schematic fragmentary plan view, with parts broken away, of the system shown in FIG. 1.

FIG. 4 is a side view of an injector carried by a shank attached to the tool bar shown in FIGS. 1-3.

FIG. 5 is a fragmentary plan view of the injector and part of the shank shown in FIG. 4.

FIG. 8 is a fragmentary plan view of part of the timing distributor shown in FIG. 7.

FIG. 9 is a partly sectional view, with parts broken away, taken on line 9—9 of FIG. 7.

FIG. 11 is an enlarged elevational view, partly in vertical section, of the control valve for the cam of the timing distributor shown in FIG. 10.

FIG. 12 is an enlarged elevational view, partly in vertical section, of the pump by-pass valve shown in FIGS. 1-3.

FIG. 13 is a schematic diagram of the piping of the system shown in FIGS. 1-3.

FIG. 14 is a graph showing the variation of nozzle pressure with travel distance.

DETAILED DESCRIPTION OF THE INVENTION

General

Figure 6:
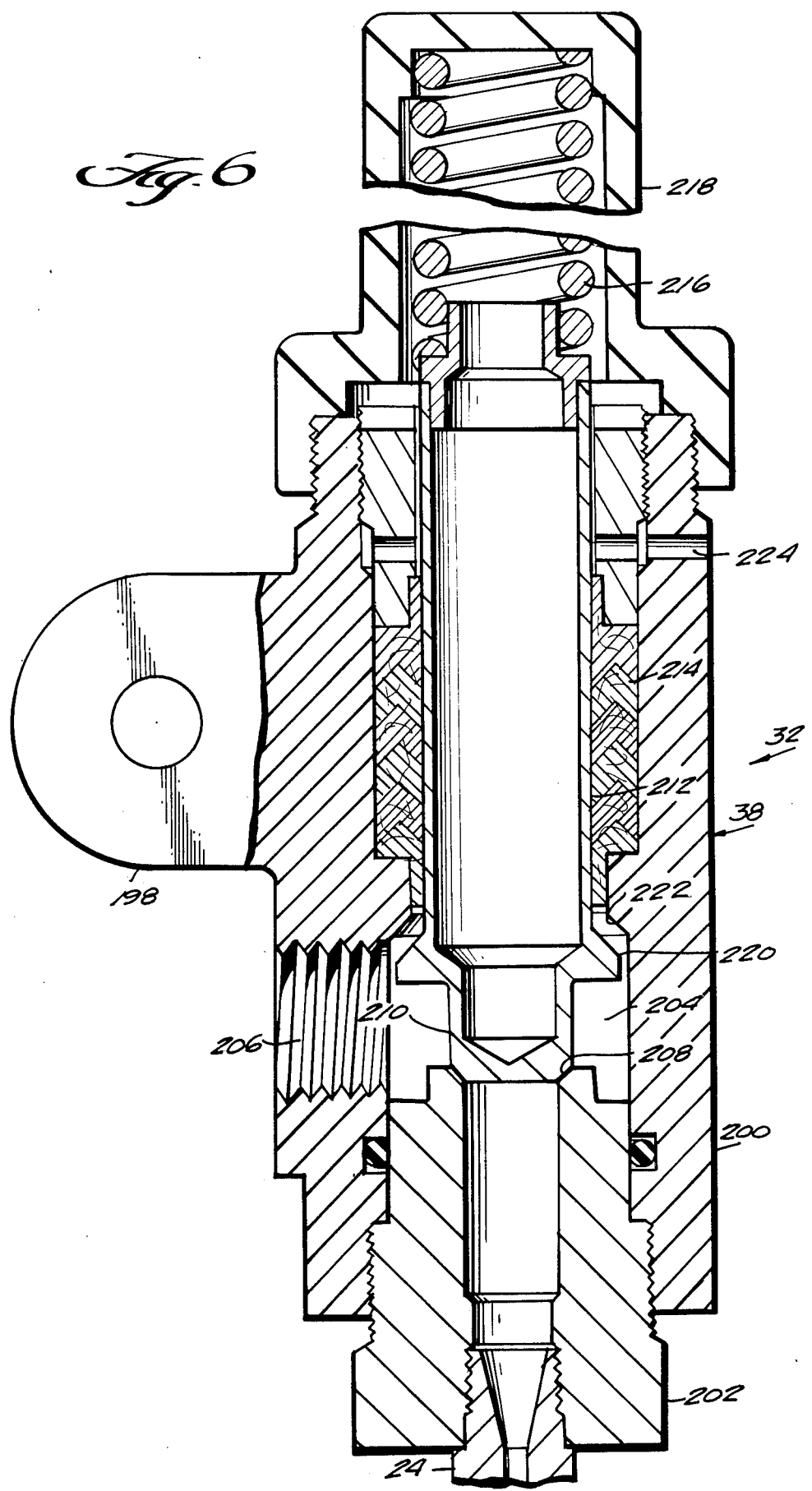
FIG. 6 is an enlarged vertical sectional view of the injector shown in FIG. 4.

One of the most important principles of this invention is the use of a number of relatively large jet nozzles (e.g. 0.094" orifice dia.) each of which injects an agricultural liquid for only a short period of time, and accordingly for only a short traveling distance, during each about 12" travel. In other words, there is a series of injections along each plant row, the injections being equally spaced on centers a predetermined agronomically effective distance, e.g. 12". The nozzles are supplied, in succession, by a timing distributor controlling a valve for each nozzle, with the liquid under high pressure from a central high pressure, metering pump. A smaller nozzle for continuous injection would not have the penetrating power of the larger nozzle. The index of penetrating power is the energy in foot pounds divided by the area to be penetrated. The area to be penetrated is equal to the length of the injection traveling distance, i.e. soil trace, times the nozzle orifice diameter. If the injection trace were 1.29" long, the penetrating area would be $0.094 \times 1.29 = 0.121$ square inches. The nozzle energy in foot pounds is equal $MV^2/2$, where $M$ is the mass of fluid $(w/g)$ discharged into the trace, and $V$ is the velocity of the jet. The energy in foot pounds per square inch is $MV^2/2 \times 1.0/(D \times L)$, or $MV^2/2D \times L$ where $D$ is the nozzle orifice diameter and $L$ is the length of the trace.

It can be shown that the energy per square inch of the soil pattern of the injection is:

$$\frac{\text{Ft. Lbs}}{\text{in}^2} = \frac{1.472 \times D \times P^{3/2}}{S \times \sqrt{W}}, \text{ where} \quad (A)$$

D = nozzle dia.-inches
P = injection pressure-psi
S = speed of tractor, mph
W = weight of liquid-lbs per gallon The timing distributor is driven at a rate proportional to ground speed of the nozzles and controls the injection time of each by a rotating cam adjustable by a hydraulic cylinder, which in turn is controlled by a pressure sensing valve. The injection time is so controlled that the injection pressure is maintained between 1800 and 2200 psi (average pressure 2000 psi). Should the pressure reach 1800 psi, the control valve supplies hydraulic fluid to the cylinder controlling the cam to reduce the circumferential extent of the cam which opens the valve of each nozzle to allow the pressure to build up. If the pressure approaches 2200 psi, the control valve moves the cam to increase its circumferential extent which opens each valve to lower the pressure. In contrast, a continuous injection system would need no control, but for a given tractor speed the nozzle size would have to be changed each time the application rate were changed. This would be completely impractical because the operator would have to store an infinite number of nozzles, and the changing of all the injector nozzles would take up far too much time for a busy operator.

One of the most important differences between this invention and the continuous injection method is the fact that the soil penetrating power, i.e., ft. lbs. per square inch, is from 3½ to 5 times greater with this system.

It can be shown that the nozzle orifice diameter D for continuous injection is:

$$D = \sqrt{\frac{10^{-6} \times 115.2 \times Q_A \times S}{\sqrt{P/\text{s.g.}}}} \quad (B)$$

where
D = nozzle dia.-inches
$Q_A$ = application rate-gallons per acre
S = tractor speed-mph
P = injection pressure-psi
s.g. = specific gravity of the liquid If an average fertilizer solution weighing 11 pounds per gallon is injected at 1980 psi pressure, and the nozzle size for continuous injection is calculated, and equation A is solved for the penetrating energy of both the continuous injection nozzle and the 0.094" diameter nozzle of this invention, the following table shows the ratio of the penetrating energy of the 0.094" diameter nozzle to that of the continuous injection nozzle.

TABLE I

| Method* | Nozzle Dia. Inches | Appln. Rate G.P.A. | Tractor Speed MPH | Trace Inches | Penetrating Energy Ft. Lbs./In² | Ratio I/C |
|---|---|---|---|---|---|---|
| C | .027 | 40 | 6 | 12 | 174 | 3.52 |
| I | .094 | 40 | 6 | .97 | 613 | |
| C | .019 | 25 | 5 | 12 | 151 | 4.87 |
| I | .094 | 25 | 5 | .51 | 735 | |

TABLE I-continued

| Method* | Nozzle Dia. Inches | Appln. Rate G.P.A. | Tractor Speed MPH | Trace Inches | Penetrating Energy Ft. Lbs./In² | Ratio I/C |
|---|---|---|---|---|---|---|
| C | .021 | 60 | 2.5 | 12 | 328 | 4.47 |
| I | .094 | 60 | 2.5 | .61 | 1471 | |
| C | .023 | 25 | 7 | 12 | 127 | 4.13 |
| I | .094 | 25 | 7 | .71 | 525 | |

*C = Continuous  I = This Invention

Therefore, it appears that the penetrating energy of the intermittent jets of this invention will be roughly from 3½ to 5 times the penetrating energy of a continuous jet. Since this is based on having the full 1980 psi pressure the full time of the injection, i.e. the full length of the trace, and since, as shown in FIG. 14, the full 1980 psi is not at the nozzle during the liquid acceleration and deceleration periods at the beginning and end of the injection, the ratio would be slightly less than indicated. For example, the trace length for 60 gallons per acre at 5 mph for this invention at a continuous 1980 psi pressure would be 1.216", whereas the actual trace length is about 1.32" (1.36–0.04), and the average pressure over this distance would be 1609 psi. The penetrating energy would therefore be 539 ft./lbs. per square inch. The 1.36" figure ignores the insignificant quantity of liquid discharged between 1.36" and 1.5" in calculating average pressure and energy of injection.

For a continuous jet applying 60 gallons per acre at 5 mph, the nozzle diameter would be 0.030, and the penetrating energy would be 170.7 ft./lbs. per square inch. The energy ratio would be 539÷170.7=3.16, which is about 30 percent less than for the 60 gpa rate at 2.5 mph, and about 35 percent less than for the 25 gpa rate at 5 mph as shown in Table I. However, it is obvious that the penetrating energy of this invention is seen to be far higher than that of a continuous jet. Even at the minimum application rate of 22.9 gallons per acre, at which the nozzle pressure curve for the acceleration and deceleration phases, FIG. 14, just peaks at a point at 1980 psi, the ratio, which is the lowest possible, will be 1.83, indicating that under the worst condition the jet of this invention will have 83 percent higher penetrating energy than that of a continuous jet.

However, it must be recognized that during the acceleration and deceleration of the liquid column of this invention, the pressures will fall below that of a continuous jet and the penetration may be less than that of a continuous jet. The length of the trace effected at these lower pressures, however, is only a small percentage of the entire length, and at the lower pressures the injection or discharge rate is lower so that the quantity of liquid injected at the lower penetration rate is only a small percentage of the total generally discharged. A small percentage of the injected fertilizer liquid near the surface is not objectionable, however, as long as most of the injected liquid is forced down to the deep roots, because there are always some roots near the surface.

Another important feature of this invention is the fact that once the tractor ground speed has been selected, and the proper sprockets for driving the pump and the distributor have been installed, the governed tractor engine speed may be throttled down as desired, as for rough ground, without changing the application rate or the nozzle discharge pressure. The traveling or ground speed, however, must not be reduced below a minimum speed, as shown at the bottom of Table III, because the maximum nozzle pressure will be reduced. In contrast, if the traveling speed of a continuous jet is reduced, the discharge pressure will drop drastically, greatly reducing the penetrating energy. If the speed is reduced 30 percent, the pressure will drop 51 percent and the penetrating energy will also drop 51 percent.

EXEMPLARY PRINCIPLE COMPONENTS OF THE SYSTEM

1. A 3-barrel positive-displacement reciprocating double-acting adjustable-stroke power-take-off (PTO) driven, metering pump 20 designed to operate at 2200 psi at 995 rpm delivering 3 cu. inches of liquid per revolution at maximum stroke or 12.9 gallons per minute. The pump 20 is similar to conventional liquid fertilizer metering pumps, except for features necessary for high speed and pressure. The delivery rate of the pump 20, at a given ground or traveling speed, is determined by the setting of the usual dial (not shown), graduated in units from 1 to 10. Since the pump 20 is PTO driven, its delivery rate is proportional to ground speed.

2. A timing distributor 22 that distributes the entire pump delivery successively to each of a series of jet nozzles 24 during each predetermined distance of tractor travel, i.e. injection spacing along a row. The timing distributor 22 includes a cam 26 that is PTO driven to effect the successive injections and also is adjustable by a hydraulic cylinder 28 to control the time length of each injection in order to maintain the desired nozzle pressure, e.g. between 1800 and 2200 psi.

3. A pressure actuated 4-way hydraulic valve 30 that operates the cam adjusting cylinder 28 of the timing distributor 22 so that if the pump pressure reaches 2200 psi the circumferential extent of the cam which opens each valve is increased for each injection to lower the pressure, and if the pump pressure reaches 1800 psi, the circumferential extent is decreased to raise the pressure, thus holding it between 1800 and 2200 psi.

4. A series of injectors 32, e.g. eight, each carried by a shank 34 attached to a tool bar 36, each injector 32 including a jet nozzle 24 and a spring-closed pressure-opened valve 38 that holds the minimum pressure in the nozzle hose to above 200 psi, and prevents it draining between injections and dissipating the pressure energy.

5. A hydraulically actuated pump by-pass valve 40 that bypasses the pump discharge back to the pump suction inlet before the tool bar 36 is actuated to raise the injectors 32.

6. A nitrogen gas accumulator 42 that absorbs the pump flow or discharge at intervals between the stopping of a jet from one nozzle 24 and the beginning of a jet from the next nozzle 24.

7. A safety valve 44 that protects the system against excessive pressure.

All critical working parts wetted by the injection liquids, e.g. valves, plungers, rods, nozzles, etc. are made of stainless steel to resist the corrosive action of fertilizer liquids.

The Assembly of the Components

As shown in FIGS. 1-3, the assembly of the foregoing components is carried by a tractor (not shown) on a frame 46 comprising longitudinal and cross members, 48 and 50, respectively. At both sides or lateral ends of its forward edge, the frame 46 is provided with sets of arms 52 attachable to the lower hitch points of a conventional tractor 3-point hitch (not shown) while at the center of its forward edge, the frame 46 is provided with another set of arms 54 attachable to the upper hitch points. Before use, the hitch height is adjusted so that during soil application the hydraulic system of the tractor maintains that height without variation.

Figure 7:
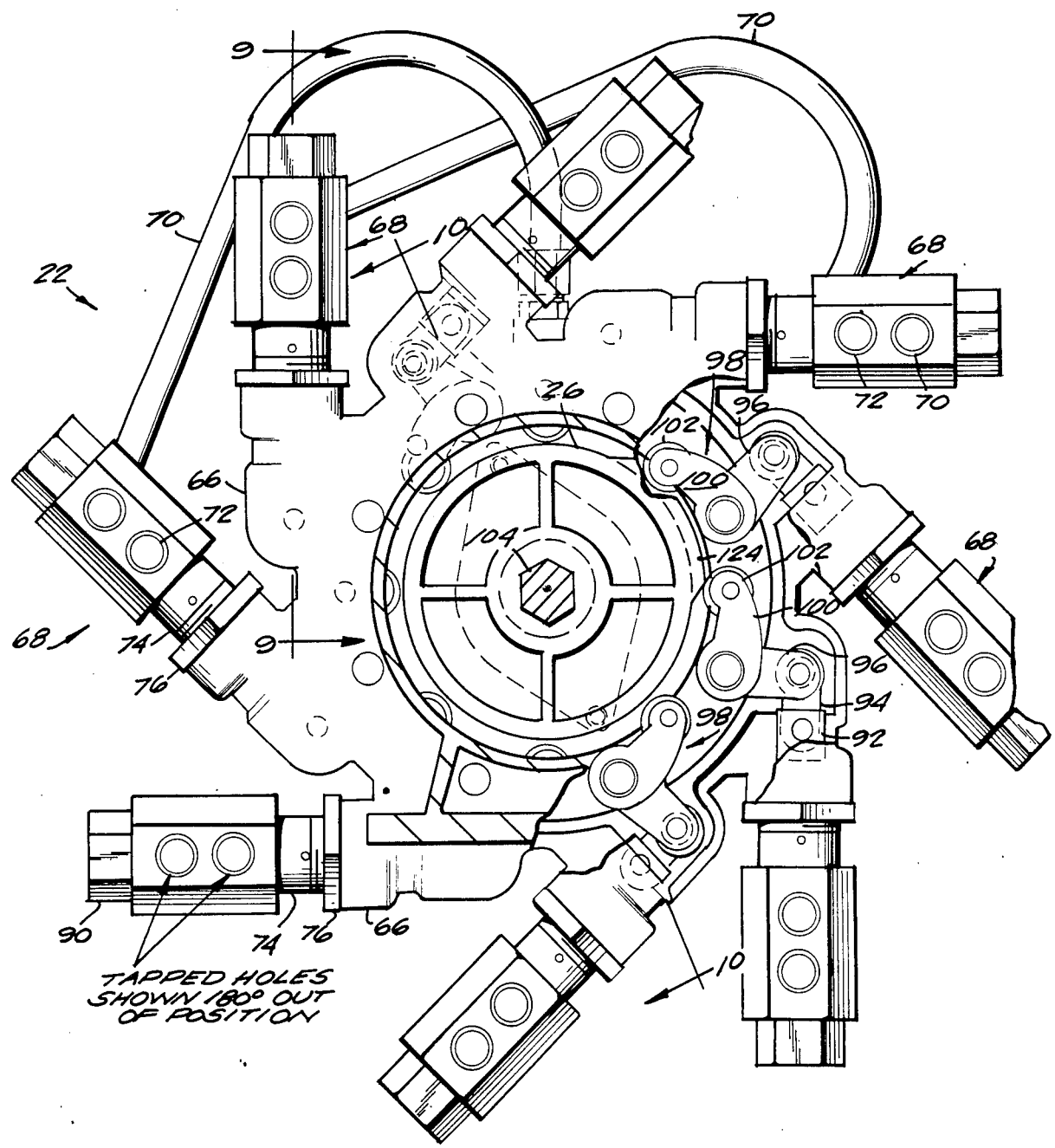
FIG. 7 is an enlarged elevational view, partly in vertical section, of the timing distributor shown in FIGS. 1-3.
Figure 10:
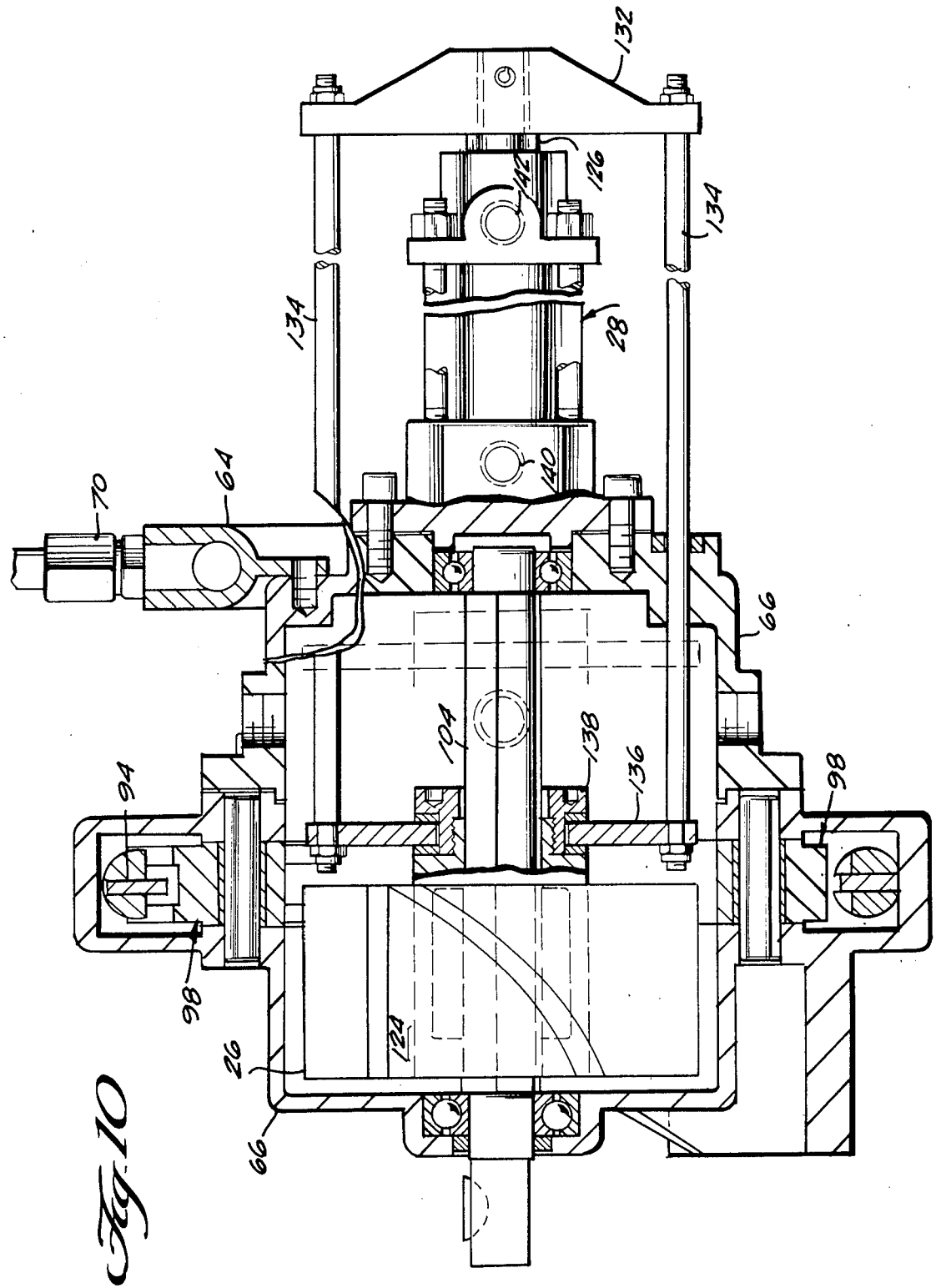
FIG. 10 is a partly sectional view, with parts broken away, taken on line 10—10 of FIG. 7.

Agricultural liquid is supplied to the pump 20 through a suction line 56 connectable to a conventional nurse tank (not shown) that may be carried on or towed behind the tractor which carries the assembly. The discharge line 58 from the pump 20 is connected to a manifold 60 that is connected, in turn via line 62, to the inlet manifold 64 of the timing distributor 22 which is fastened to one end of the distributor case 66 as shown in FIGS. 8 and 10. The case 66 carries a peripherally arranged series (e.g. 8) of distribution valves 68 each having an inlet line 70 connected to the manifold 64 and an outlet hose 72 leading to a separate injector 32 as shown in FIGS. 7 and 8. Each distributor valve 68, best shown in FIG. 9, essentially is a spring loaded check valve and includes a valve housing 74 threadedly fastened to the case 66 and locked thereto by a lock nut 76, a seat 78 in the housing 74, and a valve member 80 sealingly engageable with the seat 78 and having a valve-operating rod 82 extending into the case 66 through a packing gland 84. The valve member 80 is maintained in engagement with the seat 78, i.e. in closed position, by a compression spring 86 engaged between the member 80 and a spring seat member 88 engaged, in turn, by a seat member cap 90 screwed onto the housing 74. Preferably, but not necessarily, the distributor valves 68 are connected successively to the injectors 32 in chronological order.

The distributor valves 68 are each opened successively by a cross head 92 engageable with the end of the valve rod 82 and connected by a connecting rod 94 to one arm 96 of a crank 98 pivotally mounted to the distributor case 66 with its other arm 100 being provided with a roller cam follower 102 engaged with the rotating cam 26. The cam 26 is movable axially along but keyed to a shaft 104 journaled in opposed walls of the case 66. Both the pump 20 and timing distributor 22 are driven by a counter shaft 106 parallel to the cam shaft 104 and rotatable in anti-friction bearings 108 carried by U-shaped brackets 110 beneath the frame 46. The shaft 106 is driven by a propeller shaft (not shown) having double universal joints to accommodate misalignment, from the tractor PTO. Roller chains 112, 114 trained over sprockets 116, 118 keyed to the shaft 106 and a sprocket 120 on the pump shaft and a sprocket 122 on the timing distributor shaft 104, respectively, drive the pump 20 and the timing distributor 22 from the shaft 106. Preferably each chain 112, 114 and corresponding sprockets, are enclosed in suitable housings (not shown).

Each valve housing 74 is screwed into the distributor case 66, with the smaller diameter of the cam 26 engaged with the cam follower 102, until the corresponding valve member 80 is just seated tightly on its seat 78 by its spring 86. The lock nut 76 then is tightened to maintain that adjustment. As the cam 26 is rotated by the shaft 104, with the axial position of the cam as shown in FIG. 10, the circumferential extent of the cam rise or hill 124 is sufficient to open the distributor valves 68 in succession and to allow each to close before the next opens.

In the interim between distributor valve openings, the flow from the pump 20 into the inlet manifold 64 of the distributor 22 stops momentarily and the flow is diverted or absorbed into the nitrogen gas accumulator 42 which is mounted on top of the manifold 60 and stores the flow from the pump under 2000 psi for release to the inlet manifold 64 when the next distributor valve 68 opens. The circumferential extent of the cam hill 124 increases, however, from right to left as shown in FIG. 10. Thus, as the cam 26 moves to the right axially on the shaft 104, the period of time each valve 68 remains open will increase to the extent where there is substantially no interim period between one valve closing and the next opening, and even to the extent where the next opens before the preceding valve closes.

The axial position of the cam 26 is controlled by the rod 126 of the hydraulic cylinder 28 mounted exteriorly on one end of the distributor case 66 and operated by the hydraulic pressure of the usual hydraulic power system, e.g. lines 128, 130 (FIG. 13), carried by a tractor. The rod 126 is connected to a beam 132 that is connected by rods 134 to a cam beam 136 which is attached to the cam 26 by a swivel connection, e.g. a thrust bearing 138. The axial position of the cam 26 controls the pressure on the injectors 32 since for a given pump delivery rate the time period each distributor valve 68 is open, i.e. discharge time of each nozzle 24, determines the pressure. The cylinder 28 is controlled by the pressure-responsive normally-centered or flow-blocking control valve 30 arranged so that if nozzle pressure reaches 2200 psi, the valve 30 admits liquid under pressure to one end 140 of the cylinder 28 and connects the other end 142 to exhaust, to thus extend the rod 126 and move the cam 26 to the right, as shown in FIG. 10, which will increase the discharge time of each nozzle 24 and thus decrease nozzle pressure. When nozzle pressure drops to about 1820 psi, the control valve 30 blocks admission and emission of fluid to and from both ends of the cylinder 28, to thus retain the cam 26 in such pressure controlling position. Should nozzle pressure drop to about 1800 psi, the control valve 30 admits pressure to the end 142 of the cylinder 28 and connects the other end 140 to exhaust, to thus retract the cylinder rod 126 and move the cam 26 to the left which will increase nozzle pressure. As soon as such pressure has risen to about 1820 psi, the control valve 30 blocks admission and emission of liquid to and from both ends of the cylinder 28 thus retaining the cam 26 in such pressure controlling position.

The control valve 30, best shown in FIG. 11, includes a conventional normally centered or flow-blocking 4-way valve 144 having 4 ports, A, B, P and T. As best shown in FIG. 13, lines 146 and 148 connect the ports A and B, respectively, to the opposite ends 140 and 142 of the cam control cylinder 28, while port P is connected via line 150 to the pressure line 128 of the hydraulic system of the tractor and port T is connected by a line 152 to the line 130 in the tractor hydraulic system that returns the hydraulic fluid to the usual reservoir or tank (not shown) for hydraulic fluid. The 4-way valve 144 has the usual axially-movable operating stem 154 connected by a link 156 to one end of a rocker lever 158. The other end of the lever 158 is located between spaced collars 160, 162 mounted for adjustment along an axially-movable valve-actuating rod 164 and fixed in such positions by set screws 165. When the lever 158 is disengaged from the collars 160, 162, as shown, the valve 144 is in closed or centered position, i.e. the ports A and B are blocked and the port P is connected to port T. The rod 164 is connected to and movable by the rod or plunger 166 of a pressure-responsive cylinder 168 connected by a line 170 to the pump discharge manifold 60 so as to be responsive to nozzle pressure. Nozzle pressure urges the plunger 166 to extend while a coil tension spring 172 urges it to retract. The ends of the spring 172 are threadedly engaged with threaded plugs, one 174 secured to the outer end of the rod 166 and the other 176 to the other end of the cylinder 168, and locked to the plugs by circular clamps 178.

With nozzle pressure at about 1820 psi, the spring 172 balances the pressure force on the rod 166, but if the pressure drops below 1820 psi, the rod 166 will retract and raise the valve stem 154, thus opening port B to port P and port A to port T. Hydraulic pressure will then be applied to the end 142 of the cam control cylinder 28 and move the distributor cam 26 to the left as shown in FIG. 10, which will reduce the time period of nozzle discharge and raise nozzle pressure. As the nozzle pressure increases, the rod 166 extends and disengages the collar 160 from the lever 158 which will allow the valve stem 154 to move to closed position. An increase in nozzle pressure above about 1820 psi will produce the converse result, i.e. move the distributor cam 26 to increase the time period of nozzle discharge and reduce nozzle pressure.

Thus, the pump 20 may be adjusted for high or low delivery rates and the tractor may speed up or slow down, but the distributor cam 26 will be operated automatically to maintain nozzle pressure between about 1800 and 2200 psi. The set collars 160, 162 are adjustably arranged along the rod 164, so that the permissible nozzle pressure differential, i.e. variation, can be adjusted. For example, the collars 160, 162 can be adjusted to maintain nozzle pressure to from about 1905 to about 2095 psi, i.e. a variation or differential of 190 psi instead of 400 psi.

At the rear of the frame 46 is the conventional tool bar 36, square in cross section, which is carried in bearings 180 mounted to the frame so as to be rotatable about a transverse axis. Secured to the bar 36 for pivotal raising and lowering movement about a transverse axis is a series of the injector carrier shanks 34, in the form of upward-facing channels, which normally trail on the ground behind the bar. The upper end of each shank 34 is pivotally connected to the upper of a pair of plates 182 which are clamped to the bar 36 by bolts 184. The trailing end of each shank 34 is urged downward against the ground by a coil compression spring 186 engaged between the underside of a rearward extension of the lower plate 182 and a nut 188 on a bolt 190 which has its head 192 engaged against the upper side of the shank and extends downwardly through holes in the shank and plate extension and through the spring. The spring 186 urges the trailing end of the shank 34 down into low places or depressions in the ground while at the same time allows it to rise to go over high places and thus follow the contour of the ground.

Carried on the trailing end of each shank 34, by arms 194 secured thereto, is an injector 32 which includes a downwardly directed jet nozzle 24 at its lower end. A bolt 196 through the arms 194 and an ear 198 on the injector 32 secures the latter for angular adjustment on the shank 34 for best penetration of the jet into the soil. As best shown in FIG. 6, the injector 32 also includes a spring-closed pressure-opened valve 38, similar to an ordinary relief valve, designed to open at 200–500 psi, depending on speed of travel, to prevent the hose 72 from draining and to provide initial injection pressure to prevent injection at such a low pressure that there would be little or no penetrating energy. The valve 38 includes a generally-upright tubular housing 200 having a valve seat member 202 threadedly secured in its lower end, the nozzle 24 being screwed into the seat member, and an interior valve chamber 204 provided with an inlet 206 connected to the hose 72. Engageable with the valve seat 208 is a valve member 210 having a plunger or piston 212 of larger diameter than the seat extending through a packing gland 214 into engagement with a coil compression spring 216 held in place by a cap 218 screwed onto the housing 200. The spring 218 urges the valve member 212 to closed position against the seat 208, but pressure in the valve chamber 204 over 200–500 psi will open the valve 38 to emit a liquid jet from the nozzle 24.

The valve plunger 212 is hollow to reduce its weight and avoid high inertia forces because the valve 38 must open and close at rates as high as 616 times per minute at traveling or ground speeds of 7 mph. Further, the plunger 212 includes a valve flange or member 220 sealingly engageable with a seat 222 in the valve chamber 204 opposite the seat 208, by pressures in the chamber of the order of 300–750 psi, to prevent full nozzle pressure, e.g. 2000 psi, from loading the packing in the gland 214. A vent hole 224 above the packing exhausts to atmosphere any possible leakage past the packing to prevent any accumulation of liquid in the spring cap 218. The shank 34 is wider than the injector 32 to protect the latter from hitting obstructions, such as rocks and stumps, while the hose 72 runs along the channel in the shank 34 for similar protection.

All the injectors 32 may be raised, e.g. at the end of an application row, high enough to clear obstructions, and lowered, e.g. at the beginning of an application row, by rotation of the tool bar 36 to raise and lower the shanks. For this purpose, a hydraulic cylinder 226 has one end pivotally fastened to the frame 46, as at 228, and the end of its piston rod 230 pivotally attached to an arm 232 secured to the bar 36. Extension and retraction of the rod 230 to raise and lower the injectors 32 is controlled by an appropriate operator-controlled valve (not shown) on the tractor which admits or exhausts hydraulic fluid from the tractor hydraulic system to or from the ends of the cylinder 226, via lines 234, 236 connected to the system lines 128 and 130, respectively.

As shown best in FIG. 12, the pump by-pass valve 40 includes a hydraulic cylinder 238, a piston rod 240, and a spring loaded check valve 242, identical to the application valves 68 of the timing distributor 22, having its housing 244 screwed into the rod end of the cylinder 238 so as to be opened by the piston rod 240. The inlet port 246 of the check valve 242 is connected, via line 248, to the pump discharge manifold 60 while the outlet port 250 is connected, via line 252, to the pump suction line 56. One end of the cylinder 238 is connected, via line 254, to the line 130 of the tractor hydraulic system which normally is connected to the system reservoir, while the other or rod end of the cylinder 238 is connected via line 256, to the line 128 of the tractor hydraulic system, which normally is pressurized, so as to retract the piston rod 240 and allow the check valve 242 to close. When the valve on the tractor which controls the cylinder 226 is operated to raise the injectors 32, the line 254 is pressurized and the line 256 connected to exhaust, i.e. the reservoir, so that as pressure begins to build up in the line 254, the cylinder 238 extends the rod 240 and opens the valve 242 even before the cylinder 226 raises the injectors 32, thus diverting the flow of liquid from the timing distributor 22 to the pump suction line 56 at practically zero pressure, thus stopping injection.

The lines 150, 152 connected to ports P and T, respectively, of the cam cylinder control valve 30 contain check valves 258 and 260, respectively, as shown in FIGS. 1 and 13. When line 236 is pressurized to raise the injectors 32, the check valve 258 blocks flow from port P and the check valve 260 blocks flow to port T. Thus, when the injectors 32 are raised, the cylinder 28 controlling the cam 26 of the timing distributor 22 is locked in position and cannot change position until the injectors 32 are lowered.

When the operator-controlled valve on the tractor is operated to lower the injectors 32, the reduction of pressure in line 254 to practically zero will allow the by-pass valve 40 to close immediately, thus causing the injectors 32 to start discharging before they have been lowered to operating position. Such discharging not only will waste fertilizer solution but also, since it is directed rearward, possibly spray the nurse tank and wagon towing the same with resulting corrosion damage. Further, the weight of the injectors 32 and shanks 34, which tends to retract the rod 230 of the cylinder 226, may draw hydraulic fluid from the line 234 faster than it is being pumped and momentarily lower pressure therein to nearly zero. Pressure will not build up in the line 234 until the rod 230 has fully retracted and the injectors 32 are in operative position.

In order to avoid the above-described premature discharge from the injectors 32 and prevent the by-pass valve 40 from closing until the injectors are lowered to operative positions, a conventional counter balance valve 262 (FIGS. 12 and 13) is connected into the line 254. This valve 262 freely admits flow from the line 254 into the end of the cylinder 238 opposite the rod 240, but restricts outflow from the cylinder through the line 254 to the extent that the rod 230 of the ejector-raising cylinder 226 must fully retract and pressure in line 254 build up to about 200 psi before the rod 240 of the by-pass valve cylinder 238 will retract and close the by-pass valve 40.

The pump by-pass valve 40 could be dispensed with and the power take-off drive of the tractor disengaged at the end of an application row and engaged at the start of the next instead of using an operator-controlled valve connected into the hydraulic system of the tractor to stop and start injection. This would not be good practice, however, because most new PTO drives are equipped with brakes that impose high inertia loads on the drive when disengaged and high starting loads when reengaged. Such continual disengagement and reengagement would soon damage or wear out critical parts. Additionally, the tractor operator has his hands full in turning at the end of each application row and aligning the tractor properly to begin the next, so it would be inconvenient and tiring to require the operator to reach the usually remote and inconveniently located PTO disengaging lever between the times he finishes one row and starts the next.

The nitrogen gas accumulator 42 is substantially conventional and equipped with an elastomeric bladder. The maximum volume the accumulator 42 must absorb due to pulses of the pump 20, together with the flow from the pump during the period when all distributor valves 68 are closed, will be about 0.50 cubic inches, which will have a frequency of up to 82 per second at maximum ground speed of 7 mph. At a pump pressure of 2200 psi, the pump pressure rise, as the 0.50 cu. in.

volume decreases the accumulator volume, will be about 41 psi for a 60 cu. in. accumulator. This would increase maximum pump pressure to 2241 psi, but for a 1 gallon (231 cu. in.) size accumulator, the pump pressure rise will be only about 7 psi which will increase maximum pump operating pressure about only 0.35%. Since a 60 cu. in. accumulator pressure rise of 41 psi will increase maximum pump pressure by only about 2%, a 60 cu. in. accumulator will be satisfactory. The accumulator 42 is factory-charged with nitrogen gas at 1200 psi. This charge will last normally one or two service years before the accumulator will need to be recharged.

The system also includes a conventional safety relief valve 44 connected, via lines 264 and 266, between the pump discharge and suction lines 58 and 56 to protect the pump 20 and other components from excessive pressure. The safety valve 44 is adjusted to "crack" at about 2340 psi, and when fully open and discharging maximum pump flow of 12.93 gpm will allow system pressure to rise to about 2700 psi.

There follows a Table II showing various typical characteristics of a system embodying this invention using the components described above and 8 injectors 32 with 0.094" dia. nozzle orifices spaced 20" apart and timed to make one injection per nozzle for each 12" travel, i.e. injection spacing in a row of 12" on centers.

timing distributor cam 26 and tractor speed. A 12" travel distance per injection, i.e. 12" on centers injection spacing in a row, is deemed satisfactory for agronomical purposes. The maintenance of such spacing for a given speed can be accomplished easily by adjusting the drive ratio for the timing distributor 22, e.g. by the selection of a sprocket 118 of proper size for driving the timing distributor from the shaft 106. Similarly, a miximum desired application rate, i.e. a maximum pump delivery rate (with the pump dial set at 10) for a given speed is accomplished by adjusting the pump drive ratio, e.g. by the selection of a sprocket 116 of proper size for driving the pump 20 from the shaft 106.

For example, for the same system characteristics which are listed in Table II, a tractor may have a 1000 rpm power take off at a speed of 7 mph, the timing distributor shaft 104 may have a 60 tooth RC 50 driven sprocket 122 and the pump shaft may have a 33 tooth RC 60 driven sprocket 120. With these parameters, a Table III can be developed listing for various speeds the correct size for the timing distributor drive sprocket 118 to obtain one injection each for all the injectors 32 during each 12" of travel. The table can also list for the same various speeds and various application rates the correct size for the pump drive sprocket 116 to obtain a selected maximum application rate at maximum pump delivery, i.e. with the pump dial set at 10. The application rate can be adjusted downward by properly adjusting the pump dial.

TABLE II

| Application | | Pump Delivery Rate At | | Length of Injection Trace At | | Injection |
|---|---|---|---|---|---|---|
| Rate At 7 mph gals/acre | Minimum[1] Permissible Speed mph | Minimum Per Speed gpm | 7 mph[2] gpm | Min. Per Speed Inches | 7 mph Inches | Discharge Time Seconds |
| 28.89 | 4.33 | 2.67 | 4.32 | .64 | 1.03 | .00835 |
| 25 | 4.07 | 2.75 | 4.71 | .64 | 1.09 | .00883 |
| 30 | 3.62 | 2.93 | 5.66 | .64 | 1.23 | .00997 |
| 35 | 3.25 | 3.06 | 6.60 | .64 | 1.37 | .01111 |
| 40 | 2.95 | 3.18 | 7.54 | .64 | 1.51 | .01225 |
| 45 | 2.70 | 3.27 | 8.48 | .64 | 1.65 | .01339 |
| 50 | 2.49 | 3.35 | 9.43 | .64 | 1.79 | .01459 |
| 55 | 2.30 | 3.41 | 10.37 | .64 | 1.73 | .01568 |
| 60 | 2.15 | 3.47 | 11.31 | .64 | 2.07 | .01682 |
| 65 | 2.01 | 3.52 | 12.26 | .64 | 2.21 | .01796 |
| 68.57 | 1.92 | 3.58 | 12.93 | .64 | 2.31 | .01878 |

[1] Application below min. permissible speed will have insufficient nozzle pressure.
[2] Speed over 7 mph may damage pump and timing distributor and safety valve will open.

The distance traveled per one injection/per injector 32 depends on relation between rotational speed of the

TABLE III

Size For Timing Distributor And Pump Drive Sprockets At Various Speeds And Selected Maximum Application Rates, For 12" Injection Spacing In Each Row*

| Max. Ground Speed mph | Timing Dist. | Drive Sprocket Size (Teeth) | | | | | | |
|---|---|---|---|---|---|---|---|---|
| | | Pump | | | | | | |
| | | 25 gpa | 50 gpa | 75 gpa | 100 gpa | 125 gpa | 150 gpa | 175 gpa |
| 2.46 | 13 | | | | 13 | 17 | 21 | 26 | 30 |
| 2.65 | 14 | | | | 14 | 19 | 23 | 28 | 32 |
| 3.34 | 15 | Min. | 10 | 15 | 20 | 25 | 30 | Pump Speed |
| 3.03 | 16 | Output | 11 | 16 | 21 | 26 | 31 | 995 rpm |
| 3.22 | 17 | Rate | 11 | 17 | 22 | 28 | 33 | |
| 3.41 | 18 | 22.9 gpa | 12 | 18 | 24 | 30 | | |
| 3.60 | 19 | At Min. | 13 | 19 | 25 | 31 | D = Dial Setting | |
| 3.79 | 20 | Speed | 13 | 20 | 26 | 33 | $D = \frac{.6844 \times GPA \times M}{N_D}$, where | |
| 3.98 | 21 | Of 4.33 | 14 | 21 | 28 | | | |
| 4.17 | 22 | mph | 15 | 22 | 29 | M = Speed, mph | | |
| 4.36 | 23 | | 15 | 23 | 30 | $N_D$ = Pump Drive, Sprocket Teeth | | |
| 4.55 | 24 | | 16 | 24 | 32 | GPA = gal/acre | | |
| 4.73 | 25 | | 17 | 25 | 33 | | | |
| 4.92 | 26 | | 17 | 26 | Example | | | |
| 5.11 | 27 | | 18 | 27 | John Deere 4220 Diesel Tractor | | | |
| 5.30 | 28 | | 19 | 28 | 5.2 mph in 4th gear | | | |

TABLE III-continued

Size For Timing Distributor And Pump Drive Sprockets At Various Speeds
And Selected Maximum Application Rates, For 12" Injection Spacing In Each Row*

| Max. Ground Speed mph | Timing Dist. | Drive Sprocket Size (Teeth) Pump | | | | | | |
|---|---|---|---|---|---|---|---|---|
| | | 25 gpa | 50 gpa | 75 gpa | 100 gpa | 125 gpa | 150 gpa | 175 gpa |
| 5.49 | 29 | | 19 | 29 | | | | |
| 5.68 | 30 | 10 | 20 | 30 | Application rate 22.9 to 75 gpa | | | |
| 5.87 | 31 | 10 | 20 | 31 | Sprockets required | | | |
| 6.06 | 32 | 11 | 21 | 32 | 27RC 50 Timing Dist. Drive Sprocket | | | |
| 6.25 | 33 | 11 | 22 | 32 | 27RC 60 Pump Drive Sprocket | | | |
| 6.44 | 34 | 11 | 22 | 33 | DIAL SETTING | | | |
| 6.63 | 35 | 12 | 23 | | 22.9 gpa — D = 3 | | | |
| 6.82 | 36 | 12 | 24 | | 75 gpa — D = 9.9 | | | |
| 7.00 | 37 | 12 | 24 | | | | | |
| Min. Speed-mph | 4.09 | 2.49 | 1.78 | 1.39 | 1.14 | .97 | .84 | .74 |

*Other parameters:
Injectors: 8 (.094" dia. jet orifice) 20" row spacing
Pump Positive displacement, adjustable delivery 2200 psi at 995 rpm, 12.9 gpm max.; adjusted for maximum delivery.
PTO: 1000 rpm
Pump Driven Sprocket: 33 tooth RC 60
Timing Distributor Driven Sprocket: 60 tooth RC 50

Table III shows a minimum speed for each application rate. Below that minimum speed, nozzle pressure will not be maintained at 2,000 psi and the injections will not achieve maximum penetration. If lower speeds are necessary, the size of the nozzles 24 (0.094" dia.) must be reduced.

The application rates shown in Table III are for maximum pump delivery rate. However, lower application rates can be obtained by adjusting the pump delivery rate, i.e. by adjusting the setting of the dial on the pump 22. For a desired lower application rate, the correct setting for the dial can be calculated from the equation or formula shown in Table III. After the proper drive sprockets 116, 118 have been installed, tractor application speed, and proportional PTO rpms, can be reduced without changing the application rate on the 12" spacing in rows, i.e. 12" travel per/injection/nozzle. Such reduction, however, should not be below the above-mentioned minimum speed.

Referring now to FIG. 14, there is shown a graph of nozzle pressure v. travel distance per injection (trace length) per each 12" travel at an application rate of 60 gpa and a speed of 5 mph. The graph shows that as each distributor valve 68 of the timing distributor 22 opens, pressure does not immediately reach 2000 psi at the corresponding nozzle 24 because after the valve opens the column of liquid in the hose 72, which typically is ½" inside dia. and 9.67' long, has to be accelerated and, as flow begins, friction loss in the hose reduces pressure at the nozzle. As a result, pressure at the nozzle 24 reaches 1980 psi only after a travel distance of about ⅝" after the distributor valve 68 opens. After the distributor valve 68 closes, the liquid column begins to decelerate and reduce the pressure at the nozzle 24 until the nozzle check valve 38 closes at 200 psi. The graph shows, however, that a nozzle pressure of about 1980 psi is had for about 52% of the discharge time and about 1000 psi for 74% of the time. Nozzle pressure is never less than 200 psi because of the injector valve 38.

Experience and calculations indicate that 75% to 80% of the amount of each liquid injection will penetrate all but the hardest soils to a depth of from 2" to 6", and that even at a nozzle pressure of only 200 psi there will be some penetration. Such penetration, with each injection having an average trace length of about 1.5" in each 12" of travel, should be agronomically satisfactory because for 20" lateral, i.e. row, spacing of injections the liquid will be as close to the plants longitudinally as it is laterally, assuming the liquid is applied midway between plant rows spaced 20" apart.

It thus will be seen that the objects and advantages of this invention have been fully and effectively achieved. It will be realized, however, that the foregoing specific embodiment has been disclosed only for the purpose of illustrating the principles of this invention and is susceptible of modification without departing from such principles. Accordingly, the invention includes all embodiments encompassed within the spirit and scope of the following claims.

What is claimed is:

1. The method of applying an agricultural liquid into the soil, without appreciable disturbance thereof, from a moving vehicle, the steps comprising:
    providing a positive displacement, adjustable-delivery-rate pump movable with the vehicle for receiving agricultural liquid from a supply thereof and continuously and substantially without interruption delivering it under a predetermined range of high pressure;
    distributing at its delivered pressure and rate the delivered liquid sequentially to multiple nozzles movable with the vehicle and spaced generally uniformly transversely of the direction of vehicle movement to form closely adjacent the soil generally downward directed successive jets of the liquid and form generally parallel uniformly spaced rows of injections of the liquid in the soil, each injection being of substantially the same predetermined quantity of liquid and each jet having sufficient velocity and sufficiently small cross-sectional area to inject the liquid into the soil to an agronomically effective depth therein without appreciable disturbance thereof;
    timing the distribution of the liquid sequentially to the nozzles at a frequency proportional to the ground speed of the vehicle so that the injections are spaced apart on centers in the rows the same predetermined distance; and
    adjusting the delivery rate of the pump to obtain a selected substantially constant rate of application of the liquid to the soil.

2. The method defined in claim 1 in which the timing step is such that the injections in each row are staggered relative to those in adjacent rows.

3. The method defined in claim 1 including the step of maintaining the predetermined range of pressures at each nozzle by adjusting the length of time the liquid is formed into a jet.

4. The method defined in claim 3 including the step of adjusting the length of time automatically in accordance with variations in pressure of the liquid at the nozzles.

5. The method defined in claim 1 including the step of selectively stopping the formation of the jets by diverting the delivery, prior to distribution, back to the supply.

6. The method defined in claim 1 including the step of allowing formation of the jets only when the pressure of the liquid at each nozzle is above a predetermined pressure less than those in the predetermined range.

7. The method defined in claim 1 including the step of accumulating the delivered liquid under the predetermined range of pressures during the times between formation of the successive jets.

8. The method defined in claim 1 including the step of driving the pump at a rate proportional to ground speed of the vehicle so that the adjusted delivery rate of the pump is proportional to such speed.

9. Apparatus for applying an agricultural liquid into the soil, without appreciable disturbance thereof, from a moving vehicle comprising:
a positive-displacement adjustable-delivery-rate pump movable with the vehicle for receiving agriculatural liquid form a supply thereof and continuously and substantially without interruption delivering the liquid under a predetermined range of high pressures;
multiple jet-forming generally-downward-directed nozzles movable with the vehicle closely adjacent the soil and spaced generally uniformly transversely of the direction of vehicle movement;
means for distributing the liquid delivered by said pump sequentially to said nozzles at the liquid's delivered pressure and rate to form generally-downward-directed successive jets of the liquid to form rows of injections of the liquid in the soil, each injection being of substantially the same quantity of the liquid and each jet having sufficient velocity and sufficiently small cross-sectional area to inject the liquid into the soil to an agronomically effective depth without appreciable disturbance thereof; and
means for operating said distributing means to achieve a successive injection frequency proportional to gound speed so that the injections are spaced the same predetermined distance apart on centers in the rows, whereby a selected substantially constant rate of application of the liquid to the soil can be had by adjustment of the delivery rate of said pump.

10. The apparatus defined in claim 9 wherein:
the distributing means is adjustable to vary the length of time the liquid is supplied to each nozzle for each injection; and
including means responsive to the pressure of the liquid on the nozzle for adjusting said distributing means automatically so that the predetermined range of pressures is maintained automatically.

11. The apparatus defined in claim 9 including means connected to the pump for diverting the delivered liquid from the distributing means back to the supply thereof.

12. The apparatus defined in claim 11 in which the diverting means is manually controllable.

13. The apparatus defined in claim 9 including normally closed pressure-opened means connected to each nozzle to allow formation of a jet only when liquid pressure on said nozzle is above a predetermined pressure less than those in the predetermined range.

14. The apparatus defined in claim 1 including accumulator means connected between the pump and the distributing means for accumulating the liquid under the predetermined range of pressures in the intervals between formation of the jets.

15. The apparatus defined in claim 1 including:
a tool bar to be carried by the vehicle for rotation about a horizontal axis transverse to the direction of vehicle movement;
a plurality of shanks pivotally connected to said bar to trail on the ground behind the vehicle, the nozzles being carried by the trailing ends of said shanks;
spring means connected between said bar and said shanks to urge the latter downward against the ground; and
a lost-motion connection between said bar and said shanks whereby the latter can be raised and lowered by rotation of said bar to raise the nozzles to an inoperative position, e.g. for turning movements of the vehicle, and to lower the nozzles to operative position for injection of the liquid into the soil.

16. The structure defined in claim 15 including manually-controllable means for rotating the bar.

17. The structure defined in claim 15 including means for automatically diverting the liquid delivered by the pump back to the pump intake while the nozzles are raised from their operative positions.

18. The apparatus defined in claim 9 including means for driving the pump at a rate proportional to ground speed so that its adjusted delivery rate is proportional to such speed and the selected rate of application of the liquid to the soil remains substantially constant substantially irrespective of ground speed.

* * * * *

UNITED STATES PATENT AND TRADEMARK OFFICE
CERTIFICATE OF CORRECTION

PATENT NO. : 4,624,193
DATED : November 25, 1986
INVENTOR(S) : Douglas JOHNSTON

It is certified that error appears in the above—identified patent and that said Letters Patent is hereby corrected as shown below:

Claims 14 and 15, Line 1 of each, change "1" to -- 9 --.

Signed and Sealed this

First Day of September, 1987

*Attest:*

DONALD J. QUIGG

*Attesting Officer*  *Commissioner of Patents and Trademarks*